United States Patent [19]
Mileski et al.

[11] 3,988,065
[45] Oct. 26, 1976

[54] REFLECTIVE DOCUMENT FEEDER

[75] Inventors: Raymond P. Mileski, Fairport; Henry T. Bober; James O. Mitchel, both of Rochester, all of N.Y.

[73] Assignee: Xerox Corporation, Stamford, Conn.

[22] Filed: May 21, 1975

[21] Appl. No.: 579,338

[52] U.S. Cl. .................................. 355/64; 198/722; 271/34; 271/200; 355/75
[51] Int. Cl.² .................. G03B 27/32; G03B 27/52; B65G 15/00; B65G 17/00
[58] Field of Search .................... 355/8, 3 R, 50, 51, 355/67–71, 64, 65, 75, 128; 271/10, 34, 200, 31; 198/129

[56] References Cited
UNITED STATES PATENTS

| | | | |
|---|---|---|---|
| 3,062,110 | 11/1962 | Shepardson et al. | 355/8 |
| 3,288,047 | 11/1966 | Limberger | 355/8 |
| 3,341,194 | 9/1967 | Bentzman | 271/200 |
| 3,589,713 | 6/1971 | Schulze | 271/31 |
| 3,615,134 | 10/1971 | Newcomb | 355/75 |
| 3,642,371 | 2/1972 | Jones et al. | 355/128 |
| 3,726,589 | 4/1973 | Difulvio et al. | 355/75 X |
| 3,768,803 | 10/1973 | Stange | 271/34 |

*Primary Examiner*—Richard A. Wintercorn

[57] ABSTRACT

A copying apparatus with a document copying platen, including a substantially uniformly light reflective platen cover for holding documents against the platen, and including document drive wheels having light reflective constant width surfaces partially extendable through fixed apertures in the platen cover towards the platen. The fixed apertures in the platen cover are wider than the drive wheels to allow their limited transverse movement. Light reflective shields having an aperture the same width as the wheels are mounted in the platen cover so that each wheel extends through a light shield aperture with each light shield closely fitted to both sides of a wheel. Each light shield is movable transversely together with its wheel, but each light shield constantly overlies its fixed aperture in the platen cover irrespective of this transverse movement to constantly present a substantially uninterrupted light reflective surface over the platen together with the wheel.

4 Claims, 4 Drawing Figures

REFLECTIVE DOCUMENT FEEDER

The present invention relates to document copying apparatus, and more particularly to apparatus for automatically removing documents in document copying covers for a copying station in copying apparatus.

Document copying, particularly for the faster xerographic copiers now in commercial use, such as the Xerox "4000" copier, presents challenges in the faster handling of the documents being copied in order to utilize the faster copying capability of the copier. Original documents may vary widely in size, weight, condition, value, age, opaqueness, and thickness, and may have curls, tears, wrinkles, staples, etc. This presents obvious difficulties in providing for faster and more automatic document handling without damage with an inexpensive device, and without an objectionable "print-out" of the document "background". For a document smaller than its image on the copy sheet, or a document which is transparent or significantly translucent, the copy will print-out, as background, exposed dark or shadow areas of the platen cover within the imaging area. Providing document drive means without creating objectionable large background print-out areas has presented a particular problem. The presently disclosed apparatus allows conventional manual placement of a stationary light reflective platen cover down over the document for conventional stationary document copying, and mechanized document handling by document drive means in the platen cover, but with reduced print-out of the document drive means, by reducing dark or shadow areas associated with the interface of the drive means with the platen cover.

The document handling art in copiers is well developed and includes commercial products by Xerox Corporation and others which provide for manually or automatically feeding documents onto a xerographic copying platen and/or removing them after copying. Exemplary of numerous patents noted are the following U.S. patents, which are hereby made of record as examples without any representation as to completeness: U.S. Pat. No. 3,062,110, issued Nov. 6, 1962, to D. W. Shepardson et al, Class 95-1.7; U.S. Pat. No. 3,642,371, issued Feb. 15, 1972, to H. L. Jones et al, Class 355/128; U.S. Pat. No. 3,615,134, issued Oct. 26, 1971, to D. R. Newcomb, Class 355–75; U.S. Pat. No. 3,589,713, issued June 29, 1971, to J. L. Schulze, Class 271/41; U.S. Pat. No. 3,341,194, issued Sept. 12, 1967, to L. Bentzman, Class 271/45; U.S. Pat. No. 3,288,047, issued Nov. 29, 1966, to W. Limberger, Class 95–75; U.S. Pat. No. 1,440,622, issued Jan. 2, 1923, to C. H. Owen; U.S. Pat. No. 3,567,214, issued Mar. 2, 1971, to M. G. Crandell et al, Class 271–10; and U.S. Pat. No. 3,768,803, issued Oct. 30, 1973, to K. Stange, Class 271/34.

The present invention is particularly applicable as an improvement to platen document removal systems of the type described in allowed U.S. application Ser. No. 449,307, filed Mar. 8, 1974, by A. W. Griswold (D/73675), and in commercial use in the Xerox "4500" copier. That application is incorporated by reference herein.

Further objects, features, and advantages of the present invention pertain to the particular apparatus, and details whereby the above-mentioned aspects of the invention are attained. Accordingly, the invention will be better understood by reference to the following description and to the drawings forming a part thereof, which are substantially to scale, wherein.

Figure 2:
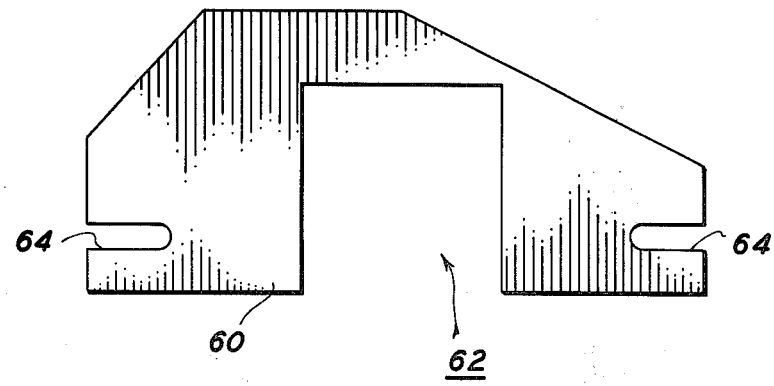
FIG. 2 is a plan view of the exemplary light shield member of FIG. 1 per se.

Referring now to the drawings, FIGS. 1 – 4, there is shown therein an exemplary document handling system 10 in accordance with the present invention. The disclosed document handling structure comprises a relatively simple and inexpensive modification of an exemplary copier, relevant parts of which are illustrated, which is an existing Xerox "4500" copier. However, it will be appreciated that the invention is applicable to many other copiers.

Figure 4:
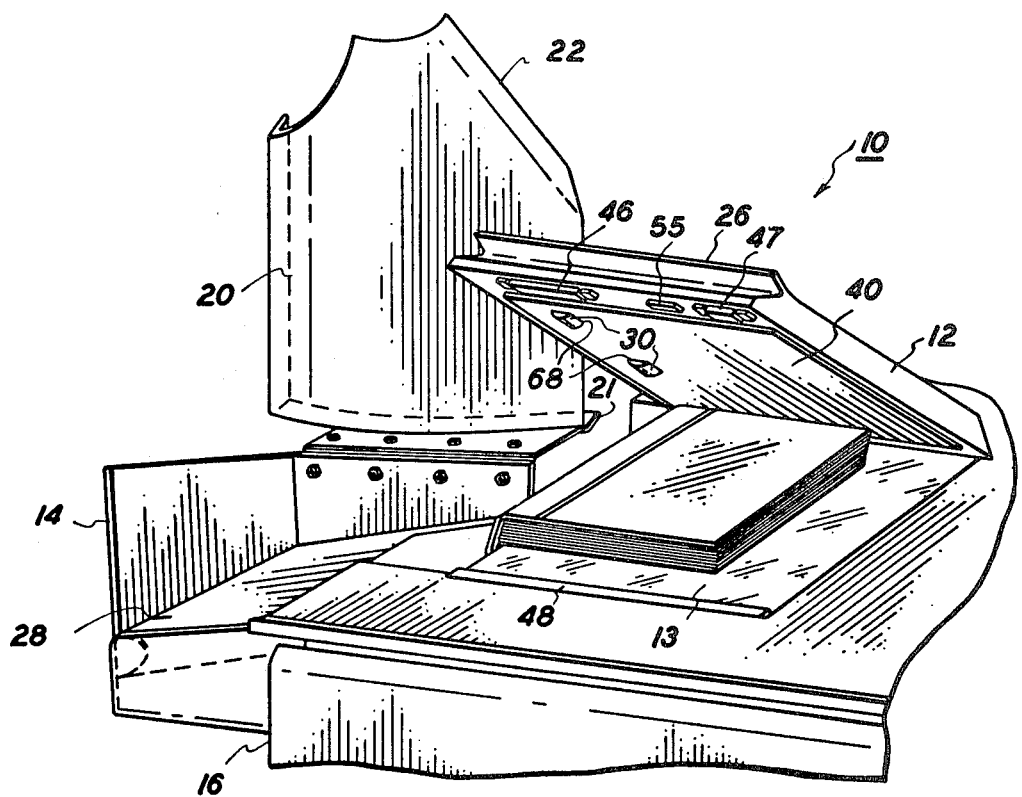
FIG. 4 is a perspective view of the embodiment of FIGS. 1 – 3, further illustrating the xerographic copying apparatus associated therewith, and with the platen cover raised away from the platen.

The disclosed related components of the present commercial Xerox "4500" copier here includes a platen cover 12 normally overlying a transparent copying platen 13 for document copying, and containing document driving means, to be further described herein. Also disclosed in FIG. 4 is the two-tier document tray assembly. This comprises a document holding tray assembly 14 mounted directly adjacent the platen 13, at the side 16. The tray assembly 14 consists of an upper document tray 20 overlying and spaced above a lower document tray 28. The upper tray 20 is substantially parallel the platen 13 and is particularly adapted to hold a stack of original documents therein for easy manual transferral of each document from this tray into the platen 13 for manual registration and copying thereon. The tray 20 has an upwardly extending inner-edge portion 22 facing the platen 13, and a rear edge or stop 21.

All of the features to be described herein are in addition to, and in parallel with, all of the previous copying apparatus 10 features. Thus, this machine 10 may perform all of its previous functions and also selectively utilize the features added by the structure disclosed herein. The disclosed modifications of the copying apparatus 10 increases the overall effective operator copying speed of the machine, particularly in those copying situations in which only a few copies are being made from each individual document. This copying speed increase is accomplished by assisting the operator with several automated functions.

The operator here can, with one hand, grasp the edge of the upper document of a stack of documents in the tray 20 and move this individual document a short distance horizontally over onto the platen 13 for copying. Meanwhile, the operator's second hand can be on the platen cover 12, pulling it downwardly to close the platen cover 12 over the document on the platen. Simultaneously, the same second hand can operate a start print button on the platen cover. This is the only operator motion and involvement required in the copying process. All other functions including document ejection can be performed automatically.

The platen cover 12 here has a conventional elongated cover closing manual handle 26 at the outer edge thereof. There is a start print switch on the top of the platen cover for a one hand operation of closing the platen cover and simultaneously actuating this switch. Operation of this start print switch initiates the conventional copying of the document on the platen in the same manner as the conventional start print button on the console (control panel) of the copying apparatus itself. However, the start print switch here further additionally initiates document ejecting upon the completion of document copying. As soon as the selected number of copies has been made from the document, it is automatically and rapidly ejected from the platen into the lower tray 28, which is positioned to catch each document as it is ejected from the platen.

The upper tray 20 here is pivotally hinged along its rear edge to the rest of the tray assembly 14 to pivot rearwardly away from the side 16 of the copying apparatus, as shown in FIG. 4. This provides unobstructed corner book copying on the platen 13 as illustrated.

Figure 3:
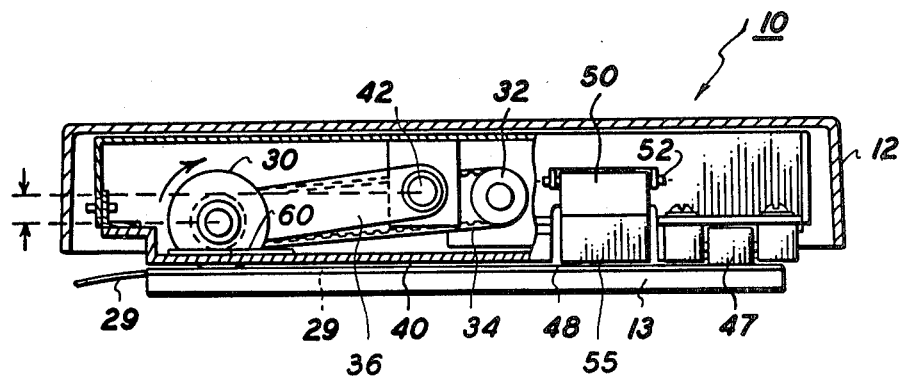
FIG. 3 is a frontal view of the embodiment of FIG. 1.

As particularly shown in FIG. 3, the disclosed means for ejecting the documents automatically from the platen 13 into the lower tray 28 after the selected number of copies has been made comprises a commonly driven pair of sheet drive wheels 30 mounted inside the platen cover 12. The drive wheels 30 are driven by a small electric motor 32 through a drive belt 34. The common axle of the drive wheels 30 is pivotably mounted to the platen cover 12 about axis 42 by a spaced pair of lever arms 36. The bottom surfaces of the drive wheels 30 retractably extend through fixed apertures in the lower surface 40 of the platen cover to lightly engage and overlie only two small areas of the platen 13. Both wheels 30 are positioned adjacent the same side 16 of the platen as the tray assembly 16. The wheels 30 are spaced sufficiently apart and positioned to engage almost any length document on the platen. However, in the case of an undersized document they may directly overlie the platen 13 within the imaging area. Their common drive axle prevents relatively skewed feeding. FIG. 3 illustrates a document 29 being ejected. The drive wheels 30 are preferably made of a resilient and high surface friction material such as a silicone elastomer. Its endless circumferential cylindrical driving surface is white or otherwise light reflecting. The width of the wheels is constant.

It will also be noted that the positioning of both of the drive wheels 30 adjacent the edge 16 of the platen from which the document is being ejected provides an important feeding advantage. In the entire document ejecting operation the document is under tension rather than compression forces. Thus, the document is not subjected to potential buckling or wrinkling forces which could cause misfeeding and damage to the document. The two drive wheels 30 are the only driving forces acting on the document at any time. No other belts or wheels are required. However, it will be appreciated that since the registration edge of the imaging area is opposite the ejection edge of the platen that the wheels 30 and their mounting holes are exposed for copying for narrow documents.

The document contacting lower surface 40 of the platen cover 12 is stationary, smooth, planar and uninterrupted, except only for the small fixed apertures for the drive wheels 30, over the entire platen 13. Only the lower portion of the drive wheels 30 partially extend through the apertures in the platen cover imaging background surface 40.

Referring now in detail to the modification of the above-described document copying and feeding arrangement to which the present invention is directed, there is disclosed herein an embodiment of a light shield assembly for the platen cover and its document drive means to allow free operation of the drive member yet provide a substantially uninterrupted light reflective surface over the platen together with the drive means.

A thin light reflective shield 60, illustrated individually in FIG. 2, is associated with each of the drive wheels 30. It is mounted inside of the platen cover 12 as illustrated in the partially broken away top view of FIG. 1. Each shield 60 is preferably made by being cut from or stamped from a thin sheet material such as "Melinex" a type of Mylar plastic. Each shield 60 has a large aperture 62 therein formed by a uniform U-shaped opening extending into the shield from one side. This aperture 62 in the shield 60 has substantially the same width as the wheel 30. As may be seen from FIG. 1, the shield 60 is mounted with the wheel 30 extending through this aperture 62, with the light shield 60 closely fitted to both sides of the wheel 30.

The shield 60 is movably mounted relative to the platen cover 12, as shown here by slide slots 64 in the shield extending transversely of the direction of motion of the wheel 30, i.e., parallel the axis of rotation of the wheel 30. Screws 66 in the inside of the platen cover 12 through the slots 64 holds the shield 60 in position, but allows the shield 60 to freely slide transversely together with the wheel 30. The screws 66 hold the shield 60 at all times in a plane which is co-planar with, and closely adjacent to, the surface 40 of the platen cover, as may be seen in FIG. 3.

The fixed openings 68 in the fixed light reflective lower surface 40 of the platen cover 12 here are substantially wider than the wheels 30 in order to allow limited transverse movement of the wheels 30 relative to the platen cover. This has been found to be necessitated by practical considerations of mounting alignments, flexibility and dynamic loads. If the fixed openings 68 were made to closely abut the sides of the wheels 30 they could cause excessive friction or binding of the wheels 30. However, leaving a relatively large gap exposed between the sides of each wheel 30 and the sides of its fixed opening 68 in the platen cover would allow light to enter this area and be absorbed, thus forming highly visible shadow area. This would cause a background dark space on the copies when ever there would not be an opaque document between this wheel well shadow area and the platen 13, because this opening at the sides of each wheel 30 would be a non-reflective area in contrast to the rest of the surface 40 of the platen cover. There is an abrupt transition in the reflective background surface at the side of the cylindrical wheel 30, since the wheel surface ends abruptly there. Thus, there is a high contrast area which can cause a sharp line to print out on the copy sheet whenever it is exposed, unless there is a very closely adjacent light reflective surface.

Figure 1:
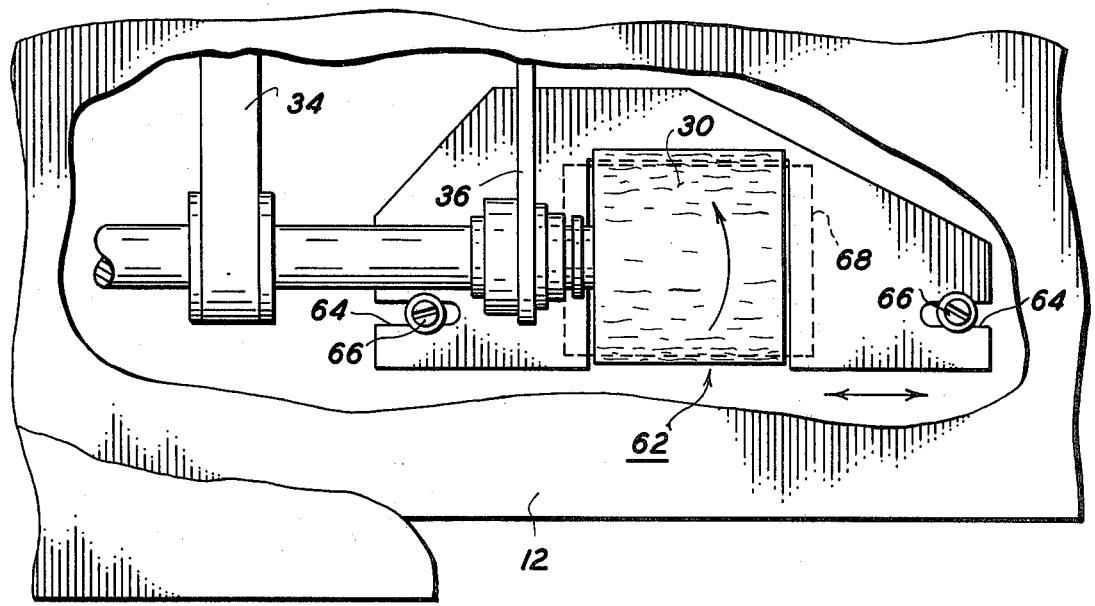
FIG. 1 is an enlarged partial top view, partially broken away, of an exemplary embodiment of the present invention, as part of an otherwise conventional xerographic copying apparatus.

The other potential shadow areas associated with the document drive means here are at the front and back of the wheels 30, where the surface of the wheel curves up away from the platen and into the platen cover 12 through the front and back of the fixed opening 68. However, these areas are not as difficult a background print out problem because the surface of the wheel itself is reflective and its circumferential surface curves away gradually, rather than abruptly from the platen. Further, it may be seen from FIG. 1 that the diameter of the wheel 30 is greater than the front to back dimensions of the fixed opening 68, so that the light reflective surface of the wheel always overlies the entire fixed opening 68 in this direction, in contrast to the situation described above at the sides of the wheel. Thus, the front to back dimensions of the shield aperture 62 can be larger than the fixed opening 68, as shown in FIG. 1. The very thin and flexible nature of the plastic sheet forming the shield 60 provides a very small area of frictional contact with the sides of the wheel 30.

It may be seen that although the light shield 60 is freely movable transversely together with the document driving member to constantly maintain a substantially light tight fit against its uniform width sides, that the light shield is nevertheless constantly overlying all of the area of its fixed opening 68 in the platen cover which would otherwise be exposed, i.e., not occupied by the wheel 30 itself. Thus, the reflective light shields 60 together with the reflective wheels 30 constantly presents a substantially uninterrupted light reflective integrated surface with the entire surface 40 of the platen cover, thus providing a substantially uninterrupted light reflective surface over the entire platen 13.

Although with this disclosed arrangement all background print out of the copy sheet due to shadow areas associated with the document drive means may not be in all cases totally eliminated, nevertheless its visibility and objectionability is greatly reduced. Its reflective contrast and potential for print out is reduced to a point where it can be eliminated entirely for many regular size onion skin or parchment original documents (on which the dark background areas would have otherwise been reproduced superimposed on the document images being copied). The "superimposed background" print out is even more objectionable than the "outside areas" background print out of small originals being copied, since superimposed background can interfere with copy legibility, and cannot be removed by trimming edges off of the copy sheet.

An automatic electrical unlatching system is also disclosed in FIGS. 3 and 4. A cam 50 is centrally rotatably mounted on an axis 52 to the front edge of the platen cover 12, between magnets 46 and 47. These magnets hold the platen cover down against strip 48. This cam 50 can be forceably rotated about its axis 52 by being pulled by an electrical solenoid. Cam 50 is preferably constructed of nylon or other suitable low friction material so that its tip 55 can slidably rotate and push against the strip 48. As the cam 50 is pulled inwardly and rotates about is axis 52, its radius at the tip 55 increases slightly so as to force the platen cover 12, with the magnets 46 and 47, slightly away from the strip 48, thereby breaking the magnetic latch connection and allowing the platen cover 12 to automatically lift by spring force.

A disclosed feature in assisting the document removal from the platen by the drive wheels 30 is the position of a space between the lower surface 40 of the platen cover and the surface of the platen 13. Conventionally, a platen cover presses a document down directly onto the platen cover, and this contact determines the closed position of the platen cover. However, it has been noted that if this lower surface 40 is maintained sufficiently uniformly closely spaced above the platen 13, then in-focus and acceptable copies can be made of documents even if the documents are wrinkled or curled so as not to lie flat directly against the platen 13. By maintaining the platen lower surface 40 constantly slightly spaced above the platen 13, but within the depth of field of the copier optics, and with the platen cover extending over substantially all of the platen 13, then all of the document can be held in focus for copying over the entire platen 13. Since this space is greater than the thickness of a normal document, the document is not frictionally held between the platen cover and the platen. Thus, there is no significant frictional resistance to ejecting the document from the platen even while the platen cover is latched down. Accordingly, very little driving force or normal force is required for document ejection by the drive wheel 30 in the present system.

In the embodiment described herein there is no significant movement between the lower or imaging surface 40 of the platen cover and the platen 13 at any time. In many prior art automatic document feeders a large area moving belt or belts provides the platen lower surface, i.e., provides the white imaging background and moves over the platen while held against it to move the document. The present lower surface 40 does not move against the platen. This is an advantage since it eliminates problems of both wear and contamination of both the surface 40 and the platen 13 surface caused by such relative movement. This avoids background imaging problems due to non-uniform contamination of the light reflective surface.

The document handling system disclosed herein is presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In a copying apparatus with a document copying platen, and an overlayable light reflective platen cover for holding documents against said platen for illuminated copying thereon, and document drive means in said platen cover for driving a document on said platen, the improvement wherein:

said document drive means comprises at least one endless surfaced rotatable document drive member having a light reflective endless surface partially extendable through a minor fixed aperture in said platen cover towards said platen, said endless surface of said drive member having a substantially constant width transverse its direction of rotation, said fixed aperture in said platen cover being wider than said endless surface of said drive member transversely of said direction of rotation of said endless surface to allow limited transverse movement of said drive member relative to said platen cover, and wherein a light reflective shield, having an aperture of substantially the same width of said endless surface of said drive member, is movably mounted relative to said platen cover with said drive member extending through said light shield aperture and with said light shield closely fitted to opposite sides of said drive member, said light shield being freely movable transversely together with said drive member relative to said platen cover, said light shield constantly overlying said fixed aperture in said platen cover irrespective of said transverse movement to constantly present a substantially uninterrupted light reflective surface over said platen together with said drive member.

2. The copying apparatus of claim 1, wherein said drive member is a resilient cylindrical wheel, and said endless surface is the cylindrical surface of said wheel.

3. The copying apparatus of claim 1, wherein said light shield is a thin plate mounted inside of said platen cover, said plate being slightly larger than said aperture, and said aperture in said light shield is formed by a uniform U-shaped opening extending into said plate.

4. The copying apparatus of claim 2, wherein said light shield is a thin plate mounted inside of said platen cover, said plate being slightly larger than said aperture, and said aperture in said light shield is formed by a uniform U-shaped opening extending into said plate.

* * * * *